Dec. 22, 1931.  L. KLEIN  1,837,778
UNDERGROUND ANTENNA
Filed Feb. 28, 1929  2 Sheets-Sheet 1

Inventor
Leo Klein,
By J Stanley Burch
Attorney

Dec. 22, 1931.   L. KLEIN   1,837,778
UNDERGROUND ANTENNA
Filed Feb. 28, 1929   2 Sheets-Sheet 2

Inventor
Leo Klein,
By J. Stanley Burch
Attorney

Patented Dec. 22, 1931

1,837,778

UNITED STATES PATENT OFFICE

LEO KLEIN, OF DETROIT, MICHIGAN

UNDERGROUND ANTENNA

Application filed February 28, 1929. Serial No. 343,383.

The present invention relates broadly to improvements in radio apparatus and more particularly to an antenna that is adapted to be buried beneath the earth.

One of the primary objects of the present invention is to provide an underground antenna which aims to eliminate static and atmospheric disturbances whereby to increase the efficiency in the operation of the radio receiving apparatus with which the underground antenna is adapted to be associated.

Another important object of the invention is to provide an underground antenna that includes concentrically arranged energy collecting coils of insulated wire, the ends of said concentric coils being connected together, both energy collecting coils being buried beneath the ground with a lead wire extending from the inner coil upwardly out of the ground for connection to the radio receiving set.

A still further object of the invention is to provide an underground antenna of the above-mentioned character wherein the inner coil is confined within a cylindrical casing, the outer coil being disposed around the outer peripheral face of the casing so that said coils are maintained in spaced relation with respect to each other, there being an asphalt covering or coating over the convolutions of the outer coil for protective purposes, and further for the purpose of maintaining the convolutions of the outer coil in spaced relation.

Another object of the invention is to provide an underground antenna which is simple in construction, inexpensive, strong and durable and further well adapted for the purposes for which it is designed.

Other objects and advantages of the invention will become apparent from the following description when taken in connection with the accompanying drawings:

In the drawings wherein like reference characters indicate corresponding parts throughout the same;

Figure 5 is a transverse section taken approximately on the line 5—5 of Figure 4 looking downwardly.

Figure 1:
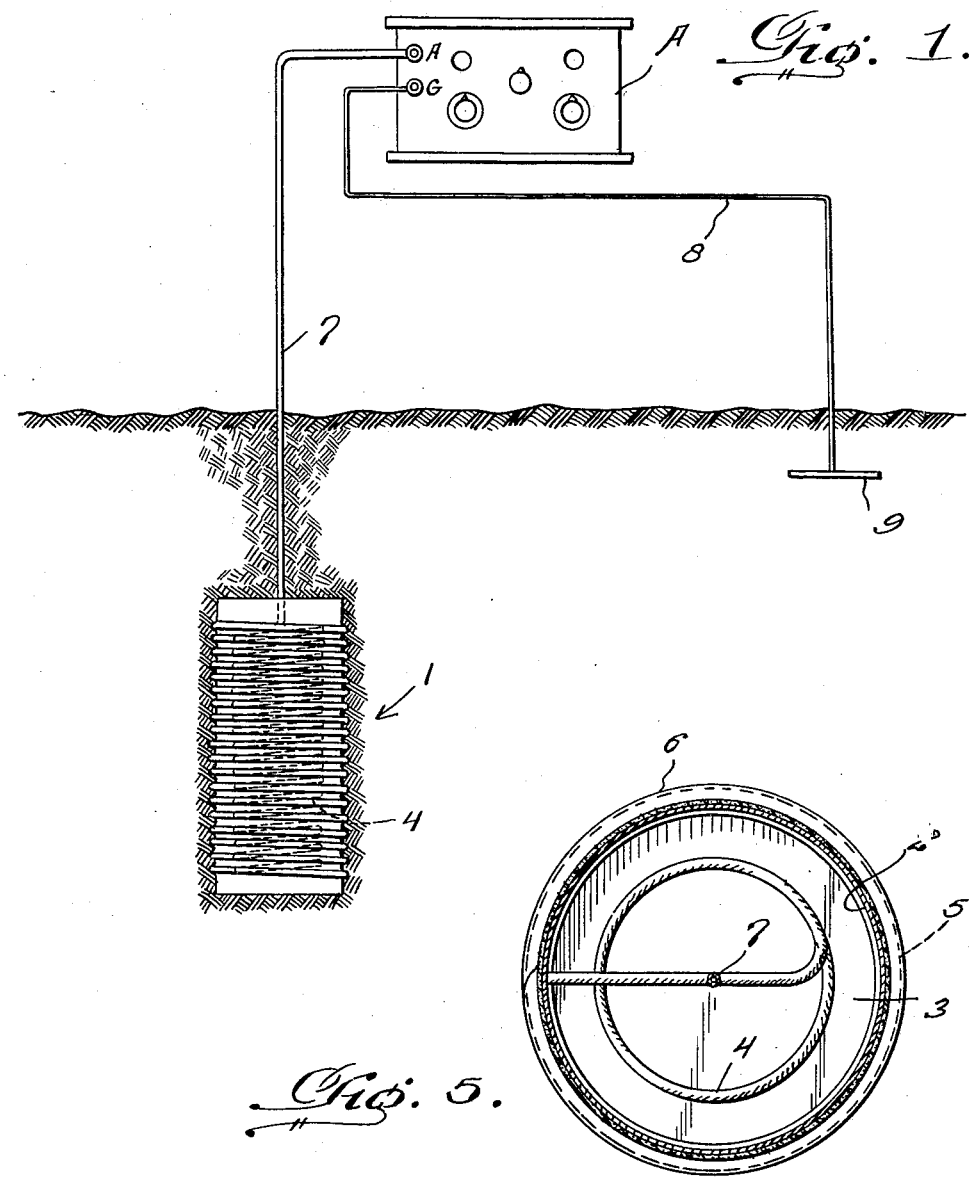
Figure 1 is a side elevation of the underground antenna embodying my invention showing the same buried beneath the earth and being connected to a radio receiving set.
Figure 2:
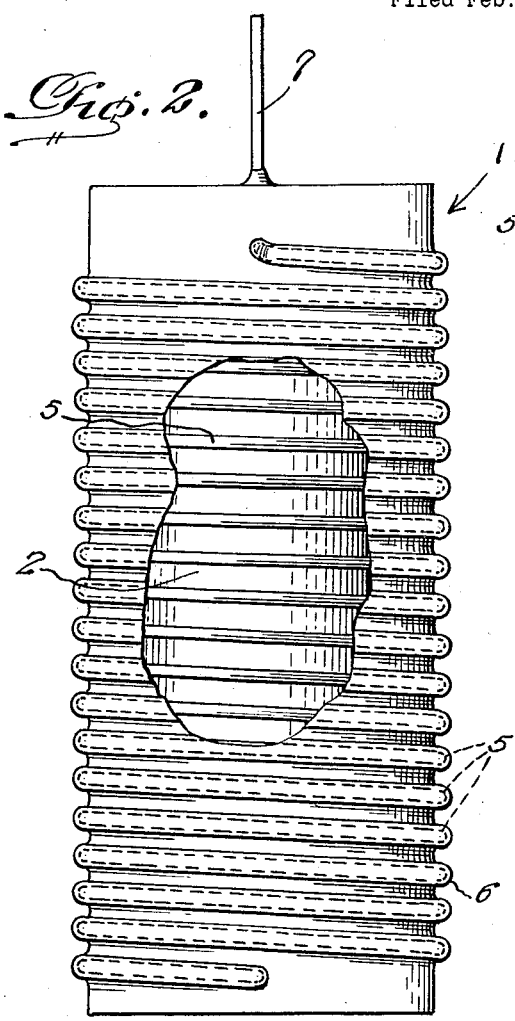
Figure 2 is an enlarged side elevation of the underground antenna per se, a portion of the asphalt covering being broken away to show the convolutions of the outer coil that surrounds the cylindrical casing.
Figure 4:
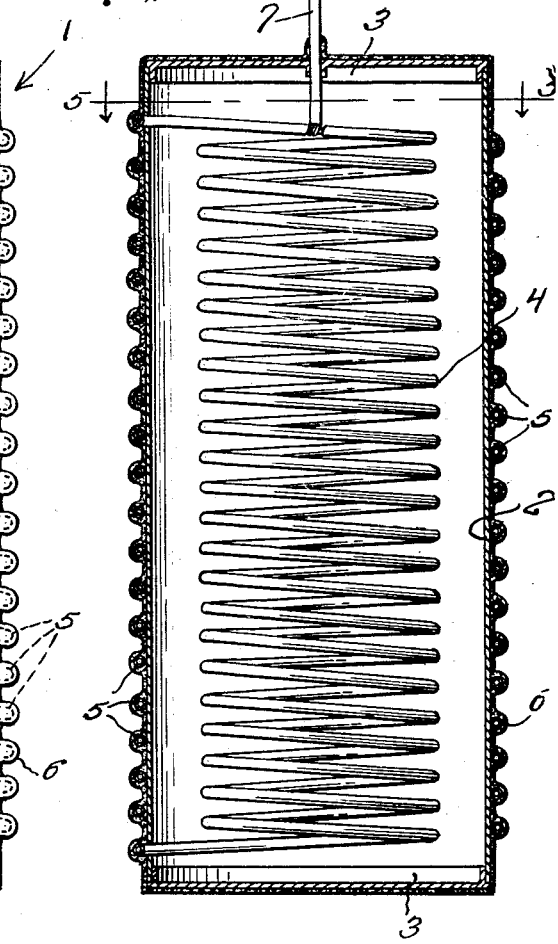
Figure 4 is a vertical sectional view through the cylindrical casing and the outer coil showing the inner coil in elevation.
Figure 3:
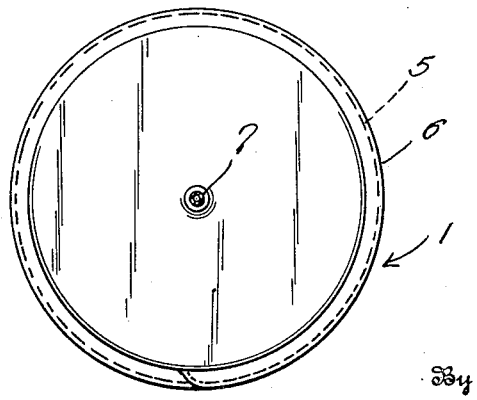
Figure 3 is a top plan view of the underground antenna.

In the drawings wherein for the purpose of illustration is shown the preferred embodiment of my invention, the numeral 1 designates generally my improved underground antenna, the same comprising a drum or casing including a cylindrical body 2, preferably constructed of sheet copper. Suitable closure caps 3 are secured within the respective ends of the casing 2 and the caps may be soldered in an air-tight manner subsequent to the positioning of the inner coil 4 within the casing. This inner coil 4 is spaced from the inner wall of the cylindrical casing and extends for substantially the full length thereof. The inner coil 4 is preferably formed of fourteen gage copper wire.

A similar coil 5 has its convolutions encircling the casing 2 for substantially the entire length thereof and these coils are covered with suitable insulation and it will be further observed that the convolutions of each of the coils are spaced with respect to each other.

For the purpose of further maintaining the convolutions of the outer coil in spaced relation with each other and to further protect the outer coil, the outer surface of the casing and its closure caps as well as the insulated wire 5 are coated with asphalt and this asphalt covering is indicated at 6.

The lower end of the inner coil 4 extends through the side of the casing 2 adjacent the bottom thereof and is soldered to the adjacent end of the outer coil 5. In a similar manner, the upper end of the inner coil 4 extends through an opening provided therefor in the side of the casing 2 and is soldered to the adjacent end of the outer coil. In this manner, the energy collecting coils are operatively connected together.

A lead wire 7 that is covered with suitable insulating material is connected at its lower end to the upper end of the inner coil 4 and this lead wire extends upwardly through the upper cap 3, the upper end of this lead wire having communication or connection with the radio receiving set A in the conventional manner. In Figure 1 of the drawings, there is illustrated diagrammatically the manner in which the underground antenna embodying my invention is buried beneath the earth and how the lead wire 7 extends upwardly through the earth for connection at its upper end with the radio receiving set. A ground wire 8 has connection at one end with the usual ground terminal on the radio receiving set while the ground plate that is embedded in the earth has connection with the other end of the ground wire 8 and this ground plate is shown at 9.

The provision of an underground antenna of the above-mentioned character will enable the radio receiving set to operate more efficiently than with the use of overhead antennas, and furthermore, due to its simplicity, the present antenna can be constructed at a very low cost. Also by coating the casing and the outer coil with asphalt in the manner as shown and described, the earth will not force together the convolutions of the outer coil and also said asphalt covering will act as a protective medium against the elements.

While I have shown a preferred embodiment of my invention, it is to be understood that minor changes in the size, shape and arrangement of parts may be resorted to without departing from the spirit of the invention or the scope of the appended claim.

What is claimed is:

In an underground antenna, a casing adapted to be buried beneath the earth, an energy collecting coil arranged within the casing, a second energy collecting coil encircling the casing, said coils being connected together at their respective ends, and a lead wire extending upwardly from one of the coils through the top of the casing above the earth for connection with a radio receiving set, and an asphalt coating over the casing and the outer coil, said coating maintaining the convolutions of the outer coil in spaced relation with respect to each other.

In testimony whereof I affix my signature.

LEO KLEIN.